United States Patent
Reinmuth (10) Patent No.: US 11,585,710 B2
(45) Date of Patent: Feb. 21, 2023

(54) CAPACITIVE PRESSURE SENSOR WITH REDUCED BIMETAL EFFECT

(71) Applicant: Robert Bosch GmbH, Stuttgart (DE)

(72) Inventor: Jochen Reinmuth, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/291,810

(22) PCT Filed: Jan. 30, 2020

(86) PCT No.: PCT/EP2020/052282
§ 371 (c)(1),
(2) Date: May 6, 2021

(87) PCT Pub. No.: WO2020/157191
PCT Pub. Date: Aug. 6, 2020

(65) Prior Publication Data
US 2021/0389201 A1    Dec. 16, 2021

(30) Foreign Application Priority Data

Jan. 31, 2019  (DE) .......................... 102019201235.3

(51) Int. Cl.
*G01L 9/00*           (2006.01)
(52) U.S. Cl.
CPC .................. *G01L 9/0072* (2013.01)
(58) Field of Classification Search
None
See application file for complete search history.

(56) References Cited

U.S. PATENT DOCUMENTS

| 2015/0198493 A1* | 7/2015 | Kaelberer | ........... G01P 15/0802 |
| | | | 73/718 |
| 2016/0122181 A1* | 5/2016 | Picco | .................... B81B 7/0058 |
| | | | 257/419 |

FOREIGN PATENT DOCUMENTS

| DE | 102015116353 A1 | 5/2016 |
| JP | H08236787 A | 9/1996 |

OTHER PUBLICATIONS

International Search Report for PCT/EP2020/052282, dated May 8, 2020.

* cited by examiner

*Primary Examiner* — Lisa M Caputo
*Assistant Examiner* — Nigel H Plumb
(74) *Attorney, Agent, or Firm* — Norton Rose Fulbright US LLP; Gerard Messina (57) ABSTRACT

A pressure sensor device for a pressure sensor, in particular a capacitive pressure sensor, having a pressure chamber bounded by a movable sensing membrane and a stationary counterelectrode of the pressure sensor device. The sensing membrane and the counterelectrode each run in the longitudinal direction and the transverse direction of the pressure sensor device. The sensing membrane is directly or indirectly spring-mounted, in particular spring-mounted in two-dimensional fashion, in the pressure chamber relative to the counterelectrode by at least one micromechanical spring element, in particular a plurality of micromechanical spring elements.

17 Claims, 6 Drawing Sheets

CAPACITIVE PRESSURE SENSOR WITH REDUCED BIMETAL EFFECT

FIELD

The present invention relates to a pressure sensor device for a pressure sensor, in particular a capacitive pressure sensor. In addition, the present invention relates to a method for producing a pressure sensor device, in particular a capacitive pressure sensor device. In addition, the present invention relates to a pressure sensor, in particular a capacitive pressure sensor, as well as to an entity having such a pressure sensor device or such a pressure sensor.

BACKGROUND INFORMATION

Some convention capacitive pressure sensor devices, or capacitive pressure sensors, have pressure sensor devices in which a bending of a movable sensing membrane as electrode, or an electrode, can be determined based on a fluid pressure difference that has arisen, via a change of an electrical capacitance of the movable electrode relative to a counterelectrode situated opposite the sensing membrane.

In such pressure sensor devices, for example a polysilicon membrane is situated opposite a counterelectrode, usually on a silicon substrate. Via a sacrificial layer etching method, a sacrificial layer between the sensing membrane and the counterelectrode is removed through an etching access that passes through the sensing membrane. Often, the etching access is then sealed with a layer deposition, and in this way the reference pressure is enclosed under the sensing membrane.

Figure 5:
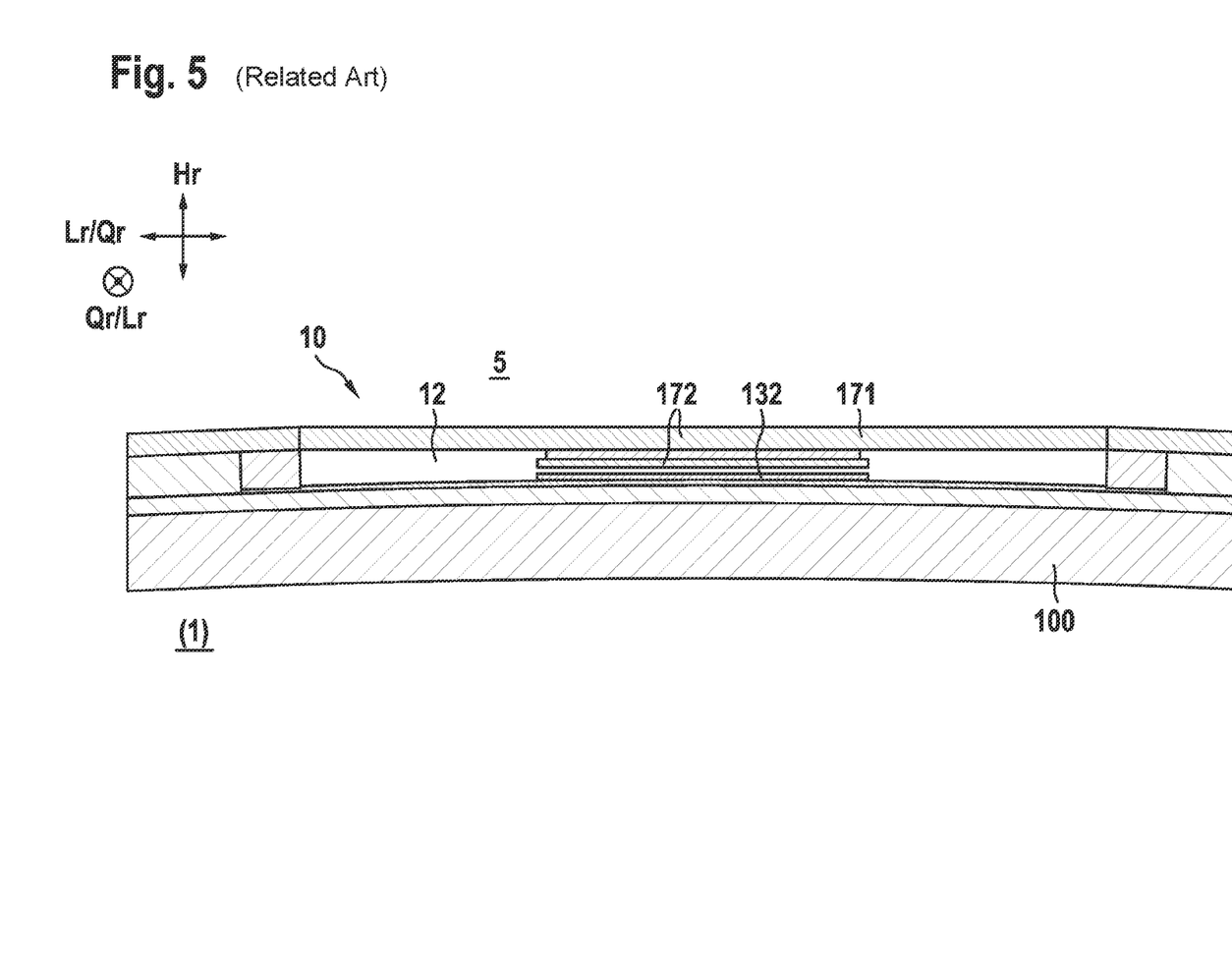
FIG. 5 shows a representation of a behavior of the pressure sensor element according to the related art from FIG. 1 when there is a global bimetal effect.

In conventional pressure sensors, it is disadvantageous (see also the description relating to FIGS. 1, 2, and 5), that in each case many small pressure sensor elements have to be combined to form a larger pressure sensor device for a pressure sensor in order to make it possible to counter a so-called global bimetal effect (stress from outside; see FIG. 5) of the pressure sensor. The small pressure sensor elements have comparatively large edge regions relative to their surfaces, which do not contribute to the actual sensing function and make the pressure sensor larger. Furthermore, in this way a possible stroke of the relevant sensing membranes is reduced, which has a negative effect on the sensing capacity of the pressure sensor.

In order to compensate the large edge regions, the base distances and the working distances (distances at nominal pressure) between the sensing membranes and the counter-electrodes are often reduced, which however results in increased sensitivity to mechanical bending (global bimetal effect) of the pressure sensor. Therefore, a compromise always has to be found between a size of a pressure sensor and its sensitivity to external stress. Furthermore, different materials in the sealing regions of the sensing membranes result in undesirable local bimetal effects of the pressure sensors (internal stress).

SUMMARY

It is an object of the present invention to provide an improved pressure sensor device, a method for its production, and an improved pressure sensor. In accordance with an example embodiment of the present invention, an effect of a global bimetal effect of the pressure sensor device is to be reduced compared to a comparable conventional pressure sensor device. In addition, the pressure sensor device according to the present invention, or the pressure sensor according to the present invention, is to be simple and robust in design, and low in cost to produce.

The object of the present invention may be achieved by a pressure sensor device for a pressure sensor, in particular a capacitive pressure sensor; by a method for producing a pressure sensor device, in particular a capacitive pressure sensor device, and by a pressure sensor, in particular a capacitive pressure sensor, as well as an entity having such a pressure sensor device or such a pressure sensor, in accordance with example embodiments of the present invention. Advantageous developments, additional features, and/or advantages of the present invention result from the disclosure herein.

The pressure sensor device according to an example embodiment of the present invention includes a (reference) pressure chamber bounded by a movable sensing membrane and a stationary (substrate) counterelectrode, the sensing membrane and the counterelectrode each running in the longitudinal direction and transverse direction of the pressure sensor device, and the sensing membrane being directly or indirectly spring-mounted, in particular spring-mounted in two-dimensional fashion, in the (reference) pressure chamber relative to the counterelectrode by at least one micromechanical spring element, in particular a plurality (multiplicity) of micromechanical spring elements.

The (reference) pressure chamber (hollow space, cavity, gap) is fashioned as a hollow space in the pressure sensor device, a defined pressure, in particular a vacuum ('fluid pressures' at 0 bar) or, if appropriate, a fluid excess pressure (in relation to an intended sensing environment), being set up there. In addition, the sensing membrane and the counterelectrode preferably each run only in a longitudinal direction and in a relevant transverse direction, which is also true of an extension of the sensing membrane and of the counter-electrode. Neither the sensing membrane nor the counterelectrode run here in the vertical direction of the pressure sensor device, apart from their respective thickness (extension in the vertical direction). Here, the sensing membrane can be spring-mounted directly or indirectly via the at least one spring element. The counterelectrode is preferably fashioned as a structured counterelectrode.

The movable sensing membrane can have an electrode movable thereby, the electrode being directly or indirectly spring-mounted, in particular spring-mounted in two-dimensional fashion, in the (reference) pressure chamber by the at least one spring element, in particular the plurality (multiplicity) of spring elements. Between the sensing membrane and the electrode, a further layer, in particular a sacrificial layer, can be provided that increases a stiffness (rigidifying element) of the electrode. That is, for such a case the electrode is preferably spring-mounted directly and the sensing-membrane is preferably spring-mounted indirectly via the at least one spring element. The electrode is preferably fashioned as a segmented electrode, analogous to the counterelectrode.

A spring element is understood as an element that, as a segment of the pressure sensor device usually made of polysilicon, deforms at least in some segments at least sufficiently elastically (actual spring, see below) during the intended practical use of the pressure sensor device. Here the spring element can have, in particular at at least one of its longitudinal end segments, a spring-stiff segment that if appropriate becomes spring-stiff only with a segment adhering thereto of the pressure sensor device; i.e., a further region of the pressure sensor device (see below) is fashioned there if appropriate. An actual spring of the spring element is here made spring-soft (see below).

In specific embodiments of the present invention, the electrode and the at least one spring element, in particular the plurality (multiplicity) of spring elements, can be constituted by a single layer of the pressure sensor device, the layer preferably being fashioned as an auxiliary layer. That is, the electrode, or the structured electrode, and the at least one spring element, or the plurality (multiplicity) of spring elements, are monolithically grown with one another or are made integrally bonded. The layer, or auxiliary layer, can be fashioned in particular as a polysilicon layer.

The relevant spring element can have a, or exactly one, first element region with which it is mechanically directly or indirectly coupled (stationary bearing) to the counterelectrode. According to the present invention, exactly one first element region can be used for each spring element. Here, the first element region can be made in particular rod-shaped or post-shaped. In addition, the relevant spring element can have at least one second element region with which it is mechanically directly or indirectly coupled to the sensing membrane or to the electrode (movable bearing). According to the present invention, two, three, four, five, or a multiplicity of such second element regions may be used for each spring element.

In addition, the relevant spring element can have exactly one, or at least one, actual spring between a/the first element region and a/the second element region, or only at a/the first or second element region. Preferably, exactly one actual spring is used for each second element region. Relevant connections here are monolithic or integral constructions, or bonds.

The/a relevant actual spring of a relevant spring element can be mechanically directly or indirectly coupled to the sensing membrane or to the electrode. Here, the actual spring can be identical with the spring element. In addition, the/a relevant actual spring of a relevant spring element can be mechanically directly or indirectly coupled to the counterelectrode. Here again, the actual spring may be identical with the spring element. Of course, these specific embodiments are kinematically exchangeable, i.e., for example by exchanging electrode and counterelectrode.

In specific embodiments of the present invention, the actual counterelectrode can be spring-stiff, the first element region can be spring-stiff, the actual spring can be spring-soft, the second element region can be spring-stiff, and/or the actual electrode can be spring-stiff. The terms "spring-soft" and "spring-stiff" are opposite in meaning. "Spring-soft" here means at least adequately more elastically deformable than "spring-stiff," or vice versa. Synonyms for "spring-soft" are for example essentially: flexible, movable, bendable, elastic, jointed, yielding, adaptable, changeable; but not (spring- or bending-) limp. Synonyms for "spring-stiff" are for example essentially: inflexible, static, immovable, un-jointed, unyielding, inelastic, spring-rigid, etc. The same is true analogously for the terms "torsion-soft" and "torsion-stiff" (see below).

For the elastic, spring-soft deformation, a substantial external change of shape of the actual spring and/or a substantial inner material change of the actual spring are possible; the substantial inner material change can have as a consequence a substantial outer change of shape (length of the actual spring). The substantial outer change of shape is a mechanical change of shape of the actual spring, which is designed as a mechanical spring, in which a stretching/compression of the mechanical spring takes place based on a shape of the actual spring. The substantial inner change of shape is an elastic change of shape of the actual spring, designed as an elastic spring, in which a stretching/compression of the elastic spring takes place based on a material of the actual spring (and not its shape, which is not important as long as it can perform its function).

The spring element can be designed as a mechanical spring and/or as an elastic spring. That is, the overall spring element is constituted as at least one actual spring. In addition, an actual spring of the spring element can be designed as a mechanical spring and/or as an elastic spring. That is, the spring element is constituted only in some segments (one or more segments) as at least one actual spring. The spring element, or an actual spring, can have an integral hinge or a film hinge at at least one longitudinal end segment.

An integral hinge, which can also be referred to as an integral pivot bearing, is understood as at least one monolithic or integral bending region in/at a material position of the spring element, in which segments of the spring element (actual spring) can be elastically bent relative to one another, or at which a mechanical further connection of the spring element (spring element) can be elastically bent (pitching movement about the transverse axis and/or longitudinal axis). A bending axis of the bending region here extends in the transverse direction and/or longitudinal direction of the spring element. An integral hinge can also be defined as follows. When there is a destructive load on the spring element, the spring element breaks in the region of its integral hinge, the integral hinge acting as a predetermined breaking point in such a case.

In specific embodiments of the present invention, the spring element or the actual spring can be designed as a spring that substantially extends in two or three dimensions. If the actual spring is formed as a spring extending substantially in three dimensions, then its extension in the vertical direction can be greater than its extension in the longitudinal direction and/or transverse direction. In addition, the spring element or the actual spring can be fashioned as a tension spring, a bending spring and/or, preferably, a torsion spring.

Figure 4:
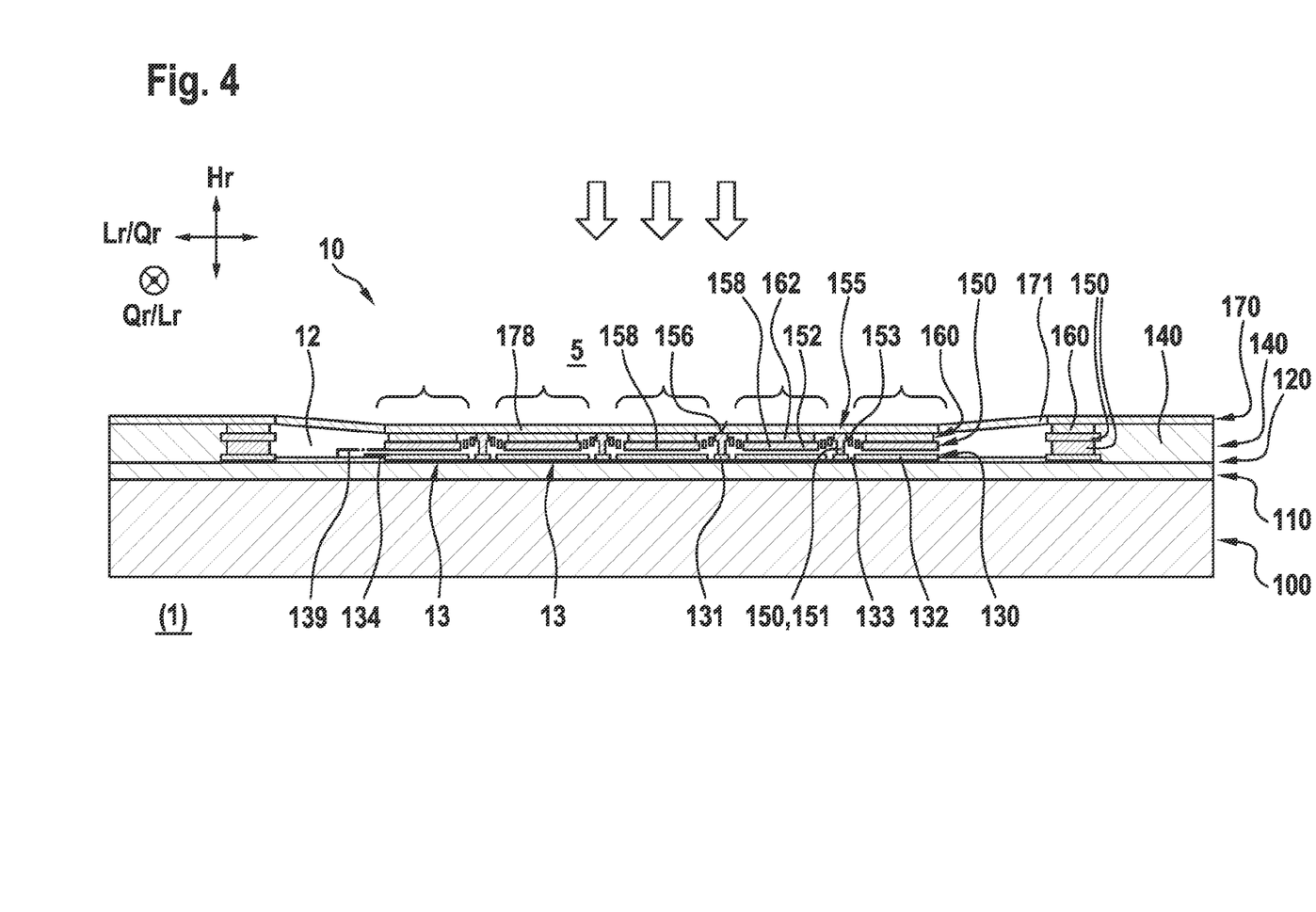
FIG. 4 shows the pressure sensor element of FIG. 3, loaded with an external fluid pressure.

In addition, the spring element or the actual spring can be fashioned as a meander spring and/or as a spring that unfolds in step-shaped fashion (see FIG. 4). Such a profile spring (the term "profile spring" is borrowed from the field of construction profiles, or profile geometry) can, in a plan view in the vertical direction (basic state), e.g., preferably be fashioned so as to be aligned, having an I-shape (elastic spring), O-shape (elastic spring and/or mechanical spring), S-shape (elastic spring and/or mechanical spring), V-shape (elastic spring), etc.

In specific embodiments of the present invention, the spring element can be fashioned as an angled spring element, at least one second element region and/or the electrode being configured relative to the first element region with an angle of less than 135°, in particular at an angle of approximately 90°. These specific embodiments are of course kinematically exchangeable. If the spring element has for example more than two second element regions, then this element has, seen in a plan view in the vertical direction, a substantially star-shaped configuration. In a two-dimensional view, laterally in the longitudinal direction and/or in the transverse direction, the spring element then has a substantially T-shaped configuration.

Figure 3:
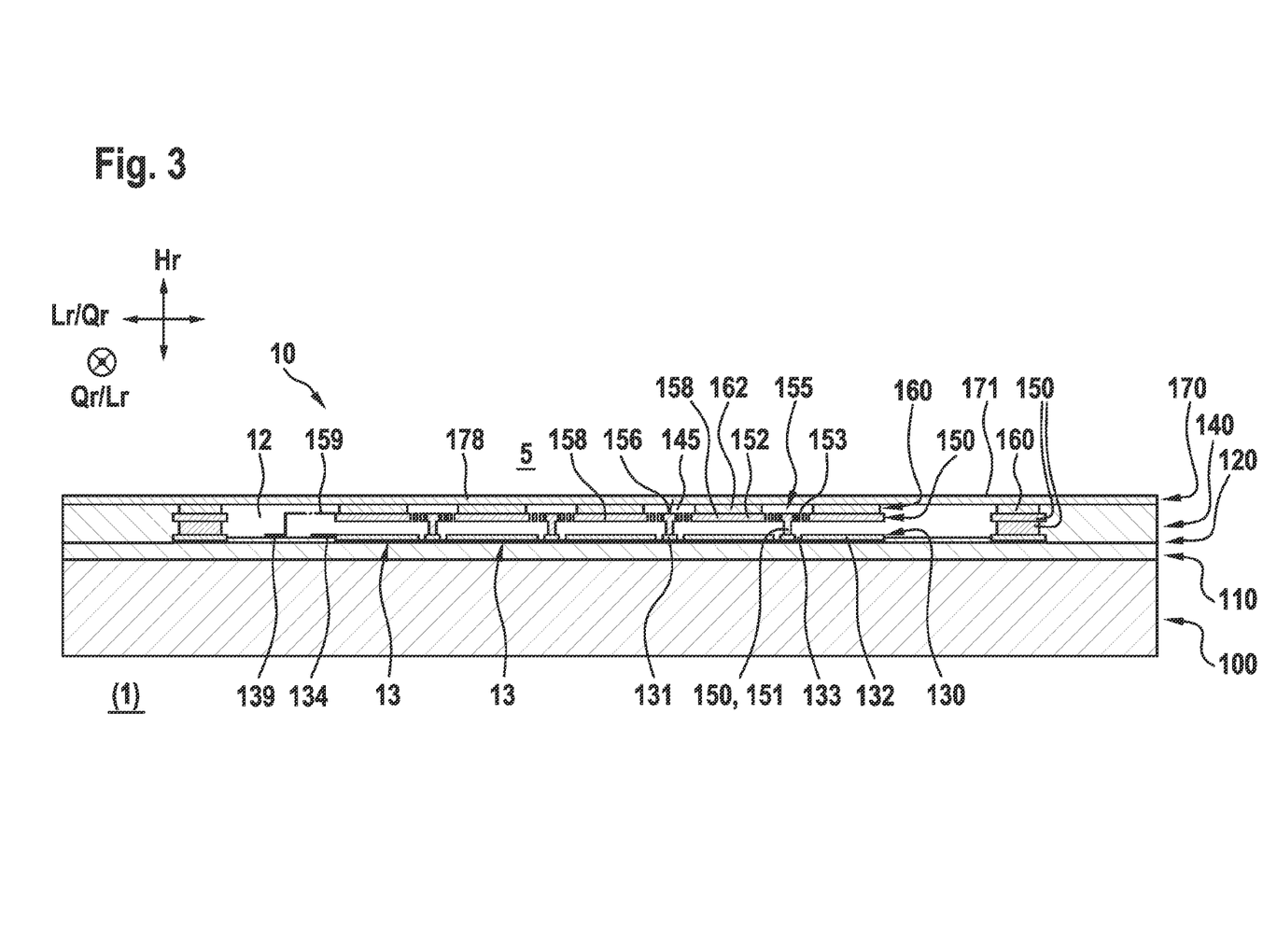
FIG. 3 shows an exemplary embodiment of a pressure sensor element according to the present invention for a pressure sensor according to the present invention, in a basic state.
Figure 6:
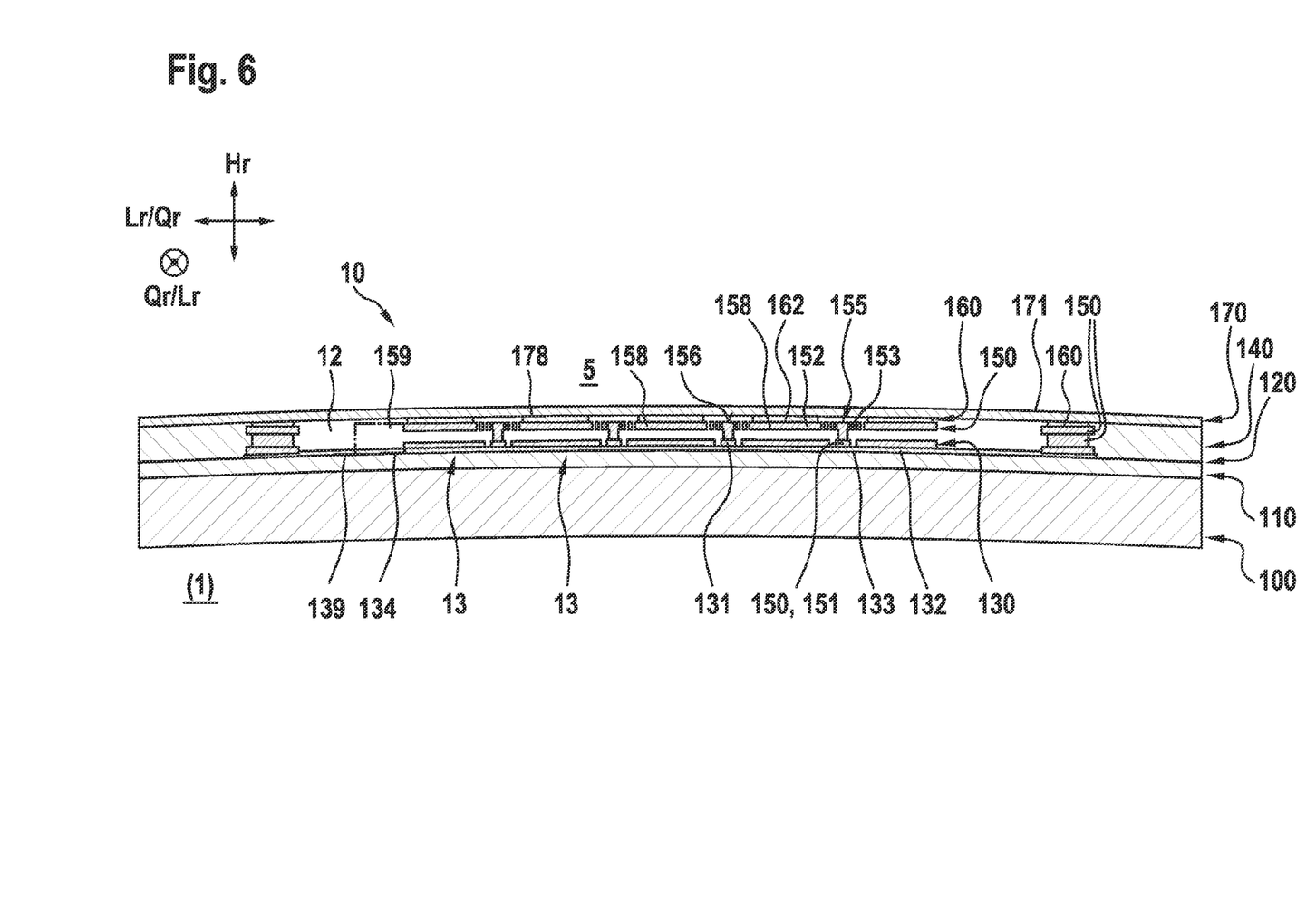
FIG. 6 shows a representation of a behavior of the pressure sensor element according to the present invention from FIG. 3 when there is a comparable global bimetal effect.

Here, the actual spring can be configured substantially in a line with a relevant second element region, from which line the first element region then stands out in correspondingly angled fashion (see FIGS. 3, 4, and 6). In such a case, the spring element has one actual spring for each second element region. In addition, the actual spring can be configured substantially in a line with the first element region, from which line a relevant second element region then stands out at an angle. In such a case, the spring element can then have only a single actual spring, independent of the number of second element regions.

The sensing membrane can be fashioned as a comparatively soft or comparatively very soft sensing membrane. Such soft or very soft sensing membranes are conventional in the related art, and differ from other sensing membranes conventional in the related art, which are comparatively harder or more brittle. In addition, the sensing membrane can be fashioned as a comparatively thin sensing membrane. Such thin sensing membranes are conventional in the related art, and differ from other sensing membranes conventional in the related art, which are comparatively thicker or very thin (see below).

In specific embodiments of the present invention, the sensing membrane and/or the electrode can be fashioned as a spring core sensing membrane and/or a spring core electrode. This is intended to mean for example that, apart from the significantly different sizes, the sensing membrane and/ or electrode, the spring elements of the pressure sensor device, and the counterelectrode have a construction analogous to an innerspring mattress. The pressure sensor device can be fashioned such that a maximum deflection of the sensing membrane in the region of the counterelectrode is between 80 nm and 1500 nm. This distance can also be set, e.g., by a dimensioning of the open spaces (see below) for the sensing membrane. In addition, the pressure sensor device can be fashioned as a reference pressure sensor device or a functional pressure sensor device.

In the method according to an example embodiment of the present invention, at least one micromechanical spring element, in particular a plurality (multiplicity) of micromechanical spring elements, is or are (first) set up, directly or indirectly, over a stationary counterelectrode of a substrate of the resulting pressure sensor device, and in temporal sequence a movable sensing membrane of the (resulting or almost complete) pressure sensor device is set up, directly or indirectly, over the at least one micromechanical spring element, in particular the plurality (multiplicity) of micromechanical spring elements.

During the setting up of the at least one spring element, in particular of the plurality (multiplicity) of spring elements, a movable electrode of the pressure sensor device is also set up, the movable electrode and the at least one spring element, in particular the plurality (multiplicity) of spring elements, being fashioned monolithically or integrally with one another. In temporal sequence, and before the setting up of the sensing membrane, a further layer, in particular a sacrificial layer, can be set up on the electrode, via which a later stiffness (rigidifying element) of the sensing membrane and/or of the electrode can be increased.

For the setting up of the at least one spring element, in particular the plurality (multiplicity) of spring elements, and of the electrode, first an auxiliary layer (preferably a polysilicon layer) is deposited, and in temporal sequence this auxiliary layer is structured in such a way that the at least one spring element, in particular the plurality (multiplicity) of spring elements, and the electrode are exposed therefrom (etching method, in particular trench method). In specific embodiments of the present invention, a spring element can be supported directly or indirectly on the substrate via an island (not a peninsula) exposed in a layer of the counterelectrode. In addition, an open space can be set up between a spring element and the sensing membrane.

The pressure sensor device in accordance with an example embodiment of the present invention may have a number of advantages. According to an example embodiment of the present invention, a particularly small pressure sensor can be produced. The pressure sensor device is insensitive in particular to bending/torsion. In addition, according to an example embodiment of the present invention pressure sensors can be produced having a low temperature offset, because good reference capacitances, subject to the same electrical and mechanical influences, can be produced. Based on the sensing membrane that is used, which is thinner overall relative to the comparable related art, there results for the sensing membrane a lower weight, which results in higher resonance frequencies of the sensing membrane. This has a positive effect on the susceptibility of the pressure sensor device to vibrations.

Without an additional outlay or an additional surface, pressure sensors can be produced having mechanical stops. This design is particularly suitable for, in particular, especially small and highly sensitive pressure sensors that are intended to be (very) insensitive to stress.

Below, the present invention is explained in more detail on the basis of exemplary embodiments, with reference to the accompanying figures, which is not to scale. Segments, elements, components, units, schemata, and/or components that have an identical, univocal, or analogous structure and/or function are identified with the same reference characters in the description of the Figures (see below), and in the Figures. In the present invention, a feature (segment, element, component, unit, function, variable, etc.) may be realized positively, i.e., present, or negatively, i.e., absent; a negative feature is not explicitly explained as a feature if, according to the present invention, no importance is placed on the fact that is absent, i.e., the actually realized present invention, and not one constructed through the related art, consists in the omission of this feature.

A feature of the present specification included in the summary (see above), description of the Figures (see below), and/or the figures may be used not only in an indicated manner, but also in some other manner (isolation, combination, replacement, addition, by itself, omission, etc.). In particular, it is possible, on the basis of a reference character and a feature assigned thereto, or vice versa, in the description, and/or the figures, to replace, add, or omit a feature in the description.

The features of the description herein are (in view of the (at first mostly unknown) related art) also capable of being interpreted as optional features; i.e., each feature can be understood as an optional, arbitrary, or preferred, i.e., as a non-binding, feature. Thus, a disentanglement of a feature, possibly including its periphery, from an exemplary embodiment is possible, this feature then being capable of being transferred to a generalized idea of the present invention. The absence of a feature (negative feature) in an exemplary embodiment indicates that the feature is optional in relation to the present invention. In addition, given a specific term for a feature, a generic term can also be read for the feature (if appropriate, further hierarchical division into sub-genera, etc.), whereby, e.g., taking into account equal effect and/or equal value, a generalization of the feature is possible. The Figures, provided only as examples, show, in each case in two-dimensional, centrally sectioned side views.

DETAILED DESCRIPTION OF EXAMPLE EMBODIMENTS

In the figures, only those spatial segments of an object of the present invention are shown that are necessary for an understanding of the present invention. In the following, the explanation of the present invention relates to (coordinate system) a longitudinal direction Lr or longitudinal axis Lr (both longitudinal directions, length), a transverse direction Qr or transverse axis Qr (both transverse directions, width), and a vertical direction Hr or vertical axis Hr (both vertical directions, thickness) of a specific embodiment of a pressure sensor device for a pressure sensor according to the present invention. A longitudinal direction Lr and a relevant transverse direction Qr can here constitute a diameter. Designations such as sensor and detector, sensing membrane and electrode, etc., are to be interpreted as synonymous, i.e., exchangeable with one another in each case when appropriate.

Below, the present invention is explained in more detail on the basis of exemplary embodiments of a specific embodiment of a variant of a capacitive pressure sensor device for a capacitive pressure sensor. However, the present invention is not limited to such specific embodiments and/or the exemplary embodiments explained in the following, but rather is of a more fundamental nature, so that it can be applied to all pressure sensors (e.g., classical pressure sensors, microphones, ultrasonic sensors, differential pressure sensors, chemical sensors that detect a chemical reaction via a change in pressure, etc.) in the sense of the present invention. Although the present invention is explained in more detail and illustrated through preferred exemplary embodiments, the present invention is not limited by the disclosed exemplary embodiments. Other variations may be derived therefrom without departing from the scope of protection of the present invention.

A capacitive pressure sensor should be as insensitive as possible to external influences. A pressure sensor device situated/set up on/in a substrate for such a pressure sensor is usually integrated into a plastic housing that is for example soldered onto a circuit board. The different materials of the pressure sensor, each having different thermal coefficients of expansion, cause a mechanical bending of the pressure sensor that is different depending on the temperature (global bimetal effect; compare FIGS. 1 and 2 with FIG. 5). Therefore, it is desirable for a capacitive signal of the pressure sensor to react, as far as possible, only to a change in pressure, but not to a mechanical bending of the pressure sensor, or of the pressure sensor device.

One approach in the related art is to make the pressure sensor element as small as possible, so that a bending of the substrate has only a small influence on a capacitive signal of the pressure sensor. In order to nonetheless obtain a large capacitive signal, many small pressure sensor elements are coupled to one another. A disadvantage of such an approach is that a thickness of a sensing membrane has to be reduced as the diameter of the sensing membrane decreases, which on the one hand is technically difficult, while on the other hand very thin sensing membranes can no longer hermetically enclose a reference pressure as time progresses. In addition, with the reduction of the diameter, and the associated reduction of the thickness of the sensing membrane, a relative scatter of process parameters also increases more and more strongly, and it becomes increasingly more difficult to obtain a pressure sensor having a defined sensitivity.

FIGS. 1 through 6 each show a pressure sensor device 10 for a pressure sensor 1 for a device, an apparatus, a module, a component, a system, etc. (entity). Pressure sensor device 10 is fashioned as a chip, or sensor chip, or is set up in a chip or sensor chip. Here, the chip can be provided on/in a chip package, or can be partly or completely integrated into a chip package. During later operation of pressure sensor 1, a fluid pressure acts on its sensing side (see the respective arrows in FIGS. 2 and 4); i.e., the sensing side of pressure sensor device 10 faces a sensing environment 5 of pressure sensor device 10, or of pressure sensor 1, having a liquid and/or gaseous fluid that is to be sensed. Sensing environment 5 can be for example an inner space, an (external) space, or the atmosphere.

Figure 1:
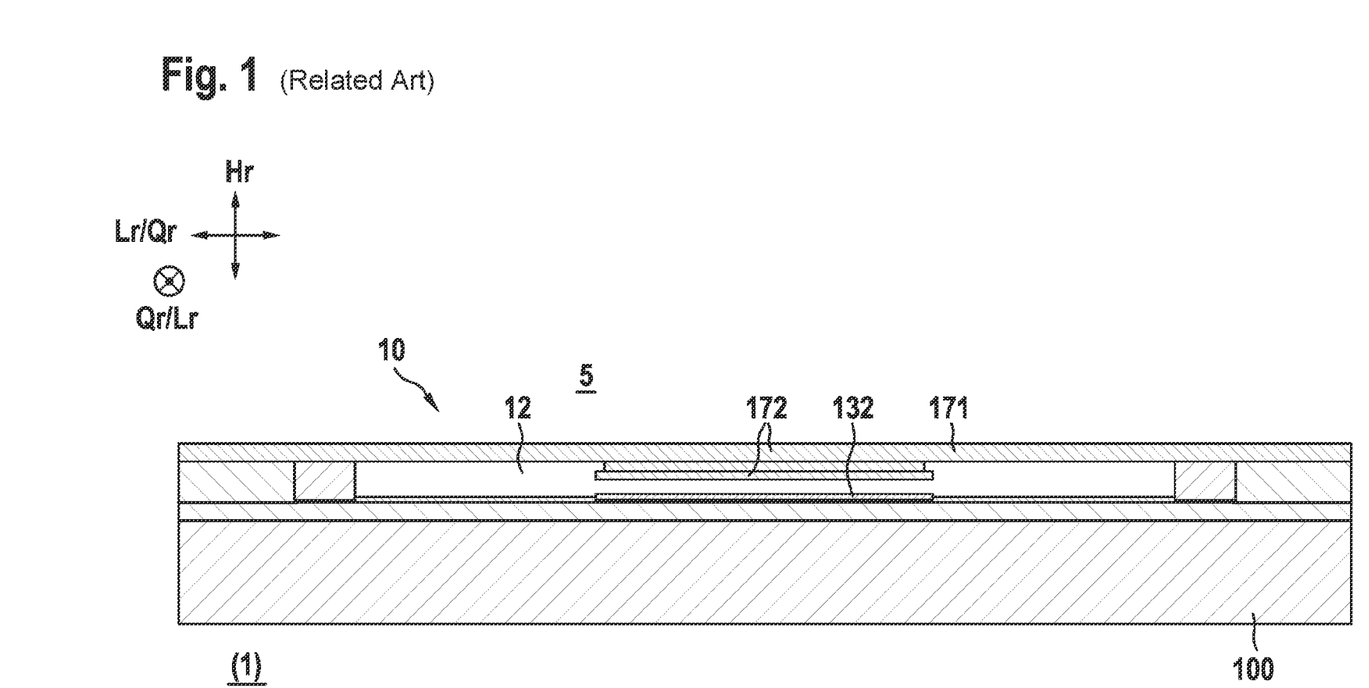
FIG. 1 shows a pressure sensor element according to the related art for a pressure sensor according to the related art, in a basic state.
Figure 2:
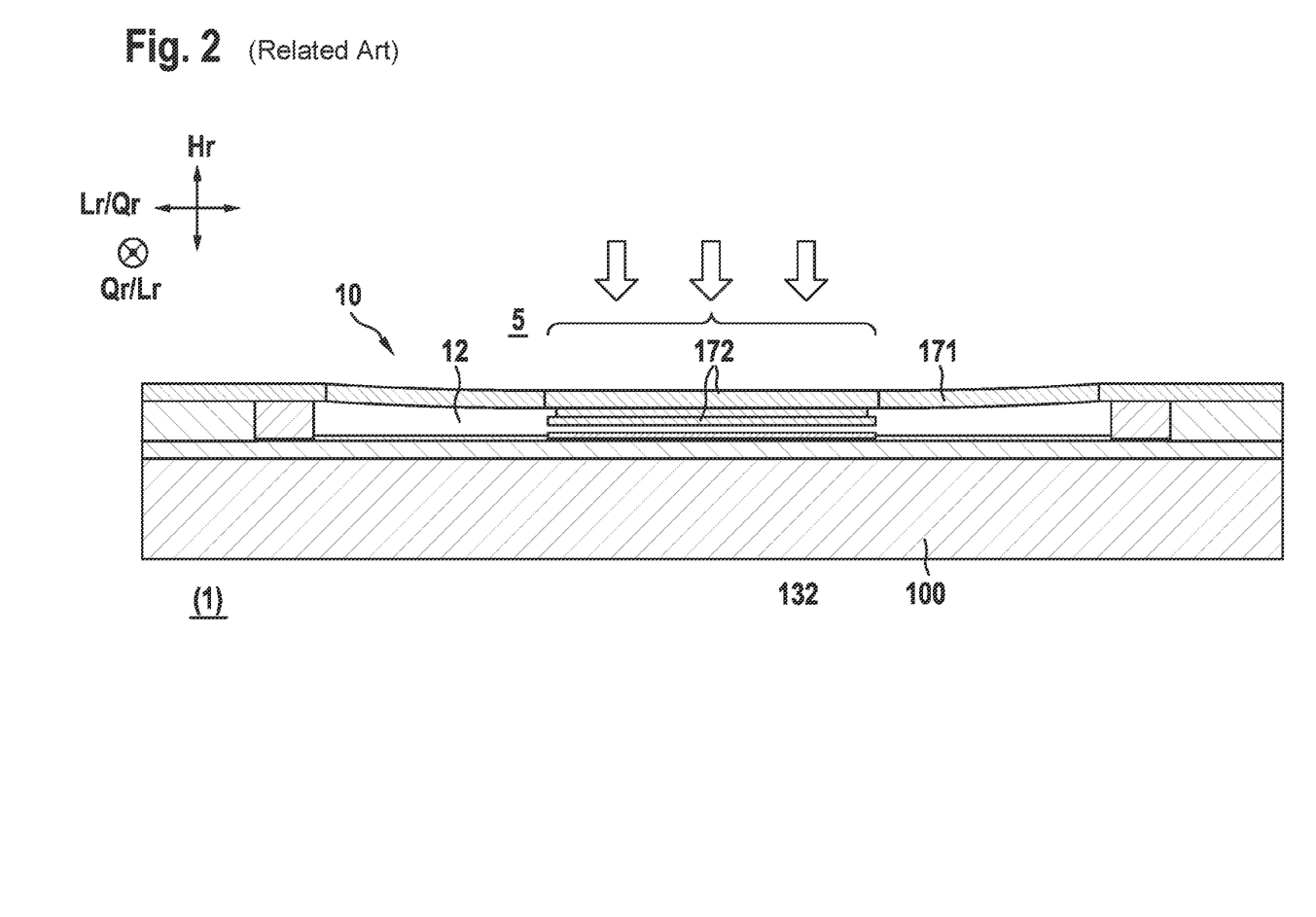
FIG. 2 shows the pressure sensor element of FIG. 1, loaded with an external fluid pressure.

FIGS. 1 (basic state) and 2 (loading with fluid pressure) show a pressure sensor device 10 according to the related art. Here, a representation, size, and geometry of pressure sensor device 10 according to the related art is adapted to a representation, size, and geometry of a pressure sensor device 10 according to an example embodiment of the present invention (FIGS. 3 and 4). In this way, the related art, here shown fictively, and the present invention can be significantly better compared with regard to global bimetal effect (FIG. 5 verses FIG. 6) and effective capacitive surface (curly brackets in FIG. 2, in addition comparatively large edge regions 171) versus curly brackets in FIG. 4, in addition comparatively small edge regions 171; increase of the present invention relative to the related art: up to more than a factor of 2, in the present case factor 1.8), or effective capacitive volume.

The pressure sensor device 10 according to the related art is built on a silicon substrate 100, and includes a sensing membrane 178, which can be loaded with a fluid pressure (see arrows in FIG. 2), as electrode 178, and, at a distance therefrom via a pressure chamber 12, in particular a reference pressure chamber 12, a stationary (relative to pressure sensor device 10) counterelectrode 132. Sensing membrane 172 and electrode 172 form a single segment of pressure sensor device 10, the actual electrode being formed integrally or materially in one piece with the actual sensing membrane, via a frame.

Here, movable electrode 172 and counterelectrode 132 form a type of plate capacitor whose capacitance varies as a function of a distance of movable electrode 172 from counterelectrode 132, and, together with a (fluid) pressure in pressure chamber 12, is a measure of a fluid pressure at sensing membrane 178. Such a pressure sensor device 10 suffers from the problems named above (global (see FIG. 5) and local bimetal effect; necessity of coupling many small pressure sensor elements, etc.). According to the present invention, a pressure sensor device 10 is proposed (see FIGS. 2, 3, and 6) in which a movable sensing membrane 178 is clamped not only at the circumferential outer edge, or at edges, but in addition is directly and/or indirectly stiffened with spring elements 155, and/or is suspended on these elements. Preferably, a soft or very soft sensing membrane 178 is used for this. Such soft or very soft sensing membranes, as well as, of course, harder ones, are conventional.

A stiffness of sensing membrane 178 for sensing a fluid pressure is substantially ensured here by spring elements 155, which are situated under sensing membrane 178 and spring-mount this membrane directly and/or indirectly; if appropriate, a stop 156 can be provided for sensing membrane 178. A region of pressure sensor 10 between a plurality (two, three, four, five, six, or a multiplicity) of spring elements 155 then acts as a single, small pressure sensor element (see above).

The properties, or spring properties (spring constant, pro-/degression, etc.) of spring elements 155 can be set as desired taking into account their size, their geometry, their material, etc. Spring elements 155 can be for example selected to be comparatively small (compared to the dimensions of pressure sensor device 10) and/or soft (compared to a conventional, comparatively thick or thin sensing membrane), whereby a distance between two directly adjacent spring elements 155 can be selected to be (very) small. Of course, larger and/or stiffer spring elements 155 can also be used, e.g., if comparatively high pressures, or pressure differences, are to be measured.

Spring elements 155 are preferably produced or set up in an auxiliary layer 150 (spring structure layer 150) that is situated between sensing membrane 178 and a (silicon) substrate 100 (layer 100) of pressure sensor device 10. Each sensor subelement 13 of pressure sensor device 10 between two spring elements 155 in the sectional representation, or a multiplicity, in particular four, spring elements 155, thereby has only a small sensitivity to a bending of substrate 100 (global bimetal effect; see FIG. 6). Due to the fact that overall a large sensing membrane 178 is used, edge regions 171 are (very) strongly reduced, and a very small pressure sensor device 10 (overall sensor module) having a high sensitivity can be built.

A pressure sensor 10 according to an example embodiment of the present invention (see FIGS. 3 and 4) includes for example a multiplicity of layers 100, 110, 120, 130, 140, 150, 160, 170 (see also below). In the present case, on a (silicon) substrate 100 there is provided an optional insulating layer 110, preferably an oxide layer 110, and on this an optional etch stop layer 120 is provided. Preferably, on etch stop layer 120 there is provided a first electrically conductive layer 130, preferably a polysilicon layer 130. A structured first electrically conductive layer 130 acts as segmented stationary electrode 132 and as strip conductor(s) 134 (, 174).

On the first electrically conductive layer 130 there is provided a (first) sacrificial layer 140, preferably an oxide layer 140, with the aid of which pressure chamber 12 and an auxiliary layer 150 having spring elements 155, and having a segmented movable electrode 158, is set up. Spring elements 155 support the segments of electrode 158 in springy fashion. On auxiliary layer 150, a (second) sacrificial layer 160, preferably an oxide layer 160, can be provided (see below), which is structured. Finally, pressure sensor device 10 has, on auxiliary layer 150 or on (second) sacrificial layer 160, a membrane layer 170 that is made electrically conductive, or preferably electrically non-conductive.

In addition, pressure sensor device 10 should be as insensitive as possible to internal influences. Particularly critical is a sealing, mentioned above, of an etching access in sensing membrane 178. Such a sealing is usually set up with a material that differs from a material of sensing membrane 178, so that this material can be removed selectively in regions not having an etching access. The different material in a region of the seal causes in sensing membrane 178 a local bimetal effect that is undesirable and that becomes stronger the smaller and thinner sensing membrane 178 is.

In order to counter this problem, pressure sensor device 10 according to the present invention can have, between sensing membrane 178 and (segmented) counterelectrode 132, an auxiliary layer 160 that makes it possible to produce etching channels and in this way to route the etching channels to the outside from the region of sensing membrane 178, and to carry out a sealing there of an etching access. In addition, with this approach sensing membrane 178 can be stiffened in its center region (rigidifying elements 162, contact regions 162 for segments of electrode 158 and/or second element regions 152), which results in a larger signal for the same electrical base capacitance, and as a result a more pressure-sensitive pressure sensor device 10 can be realized.

In the following, an example of a method for producing pressure sensor device 10 in accordance with the present invention is explained in more detail. In a preparatory, optional step, an insulating layer 110 (layer 110) can be deposited and, if appropriate, structured on a substrate 100 on which pressure sensor device 10 is constructed and/or in which pressure sensor device 10 is set up. Preferably, here an oxide layer 110 is deposited. In addition, additionally or alternatively, in a preparatory, optional step, for a later sacrificial layer method (sacrificial layer 140), an etch stop layer 120 (layer 120) can be deposited and, if appropriate, structured. Preferably, here an in particular silicon-rich nitride layer (SiN) is deposited.

In the actual method, in addition a first, electrically conductive layer 130 (layer 130) that can be used, inter alia, as counterelectrode(s) 132 and as printed conductor(s) 134, or printed conductors 134, 139 (see below), is alternatively, or can additionally, be deposited and structured. Preferably, here an in particular doped polysilicon layer is deposited. On the first, electrically conductive layer 130, or the (segmented) counterelectrode 132 and printed conductor 134 (, 139), or at least a segment thereof, a sacrificial layer 140 (layer 140), preferably an oxide layer 140, is deposited and structured, pressure chamber 12 later being set up, in particular etched in, in this oxide layer 140 (temporally after the sealing with sensing membrane 178).

Here, in particular a contact region 131 is produced or set up in each case for a relevant first element region 151 of a spring element 155 (see below). For contact regions 131 and element regions 151 that later arise, electrically conductive layer 130 is exposed in such a way that the island-shaped contact regions 131 no longer have an electrical connection to counterelectrode 132. Optionally, in addition a further sacrificial layer can be deposited and structured, in order for example to produce regions having a different distance between sensing membrane 178 and counterelectrode 132. Instead of this, it is also possible for only an incomplete etching to be made into first sacrificial layer 140, in order to reduce its thickness locally.

In temporal sequence, in particular in immediate temporal sequence, an auxiliary layer 150 (layer 150), which can also be designated spring structure layer 150, is deposited and structured. In the structuring of auxiliary layer 150, spring elements 155, or spring structures 155 (see above), are produced or set up in auxiliary layer 150. Here, at least one (actual) spring 153 (see above) is set up in each spring element 155. In particular, a plurality (two, three, four, five, or a multiplicity) of springs 153 are set up for segments of electrode 158 in each spring element 155. Preferably, a polysilicon layer is deposited for auxiliary layer 150.

In particular, in the structuring of auxiliary layer 150 it is also possible to produce very narrow trenches that are narrower than a thickness of auxiliary layer 150, in order to enable simple production of hollow spaces in a temporally following layer deposition. Preferably, an etching method is used that produces a perpendicular edge in order to structure auxiliary layer 150. Preferably, a trenching method is used for this purpose.

In temporal sequence, in particular immediate temporal sequence, a (second) sacrificial layer 160 (layer 160), preferably an oxide layer 160, is deposited and structured. In the structuring of sacrificial layer 160, in each case at least one contact region 162 is produced or set up for at least one relevant movable electrode 158, or a segment thereof, and/or for a relevant second element region 152 of a relevant spring element 155 (contact region 162 for sensing membrane 178 that is to be set up later).

Such a contact region 162 can act as a rigidifying element 162 for electrode 158, or a segment of electrode 158, and/or for a relevant second element region 152. Preferably, in addition a free space 145 is set up over each spring element 155, into which space sensing membrane 178, to be deposited later, can move. Here, a free end of a spring element 155 can later act as a stop 156 for sensing membrane 178, or electrode 158 (see FIG. 4), so that this membrane cannot move into contact with counterelectrode 132.

Here, narrow trenches and/or slits can be produced in sacrificial layer 160, and, using anisotropic etching, parts of auxiliary layer 150 can be etched out under sacrificial layer 160, or oxide layer 160. The slits can subsequently be sealed with a further oxide deposition. In this way, in individual regions auxiliary layer 150 can be removed; here a comparatively (very) large distance arises between a membrane layer 170 (layer 170) (see below) and a printed conductor 134 (, 139), having a comparatively (very) low capacitance. There results a further hollow space that can also be used for a targeted propagation of an etching medium during the etching of sacrificial layer 160. The two oxide layers 140, 160 over insulating layer 110 are structured.

In a temporal sequence, in particular immediate temporal sequence, membrane layer 170 is deposited and structured. Preferably, a polysilicon layer is applied. The etching accesses are preferably applied outside a suspension of movable sensing membrane 178. In preferably immediate temporal sequence, there takes place an etching of sacrificial layer 140. Preferably, a gas phase etching method with hydrofluoric acid is used. Sacrificial layer 140 under auxiliary layer 150 is preferably completely removed in the movable region of sensing membrane 178; (reference) pressure chamber 12 results.

Preferably, the oxides between auxiliary layer 150 and membrane layer 170 are also completely removed in the movable region of sensing membrane 178. A sealing of the etching access or accesses takes place, and a defined inner pressure (reference pressure) is set in the movable region of sensing membrane 178. Preferably, this takes place using an LPCVD deposition method or a PECVD deposition method. Preferably, an oxide layer or a silicon-rich nitride layer (SiN) is also deposited.

According to an example embodiment of the present invention, at least one spring element 155 is provided between sensing membrane 178, or electrode 158, and counterelectrode 132, or (silicon) substrate 100, the at least one spring element 155 preferably being provided in reference pressure chamber 12. A sum of all actual springs 153 of all spring elements 155 should reduce a maximum deflection of sensing membrane 178, or of electrode 158, by at least approximately 30%.

In addition, according to an example embodiment of the present invention reference capacitors can be used that include a reference membrane (sensing membrane 158) or reference electrode (electrode 158) and at least one spring element (spring element 155). Such a reference membrane 158 can have, for the reference capacitors, a construction that is geometrically similar to that of a functional membrane 158, the spring elements 155 being stiffer by at least approximately 40% than spring elements 155 of functional membrane 158. Advantageously, the reference capacitor has a small base distance between reference membrane 158, or electrode 158, and counterelectrode 132, in order to provide an approximately equal basic capacitance under working pressure.

In the region of the suspensions (second element regions 152) of spring elements 155, a thickness of sacrificial layer 160 is preferably selected to be smaller than a minimum distance between sensing membrane 178, or electrode 158, and counterelectrode 132. In this way, it is achieved that spring elements 155 can simultaneously also be used as a mechanical stop 156. When there is a fluid excess pressure, in this way sensing membrane 178, or electrode 158, can be prevented from coming into mechanical contact with counterelectrode 132. In particular for particularly small and highly sensitive pressure sensors 1, which are intended to be (very) insensitive to stress, this design is (very) well suited.

In a further exemplary embodiment, or an alternative realization of the above-described exemplary embodiments, it can be provided that the at least one spring element 155 extends in longitudinal direction Lr and/or transverse direction Qr. Here it is in particular provided that the at least one spring element 155 joins electrode 158 in longitudinal direction LR and/or in transverse direction Qr and is connected thereto.

The realizations and/or developments of the present invention explained above can be used by themselves or in any combination with one another, except, e.g., in a case of a clear dependence or incompatible alternatives.

What is claimed is:

1. A pressure sensor device for a capacitive pressure sensor, comprising:
   a movable sensing membrane;
   a stationary counterelectrode; and
   a pressure chamber bounded by the sensing membrane and the counterelectrode of the pressure sensor device, the sensing membrane and the counterelectrode each running in a longitudinal direction of the pressure sensor device and a transverse direction of the pressure sensor device;
   wherein the sensing membrane is directly or indirectly spring-mounted in two-dimensional fashion in the pressure chamber relative to the counterelectrode by a plurality of micromechanical spring elements,
   wherein the movable sensing membrane has a plurality of electrodes movable by the movable sensing membrane, wherein each electrode of the plurality of electrodes are situated between respective adjacent micromechanical spring elements of the plurality of micromechanical spring elements.

2. The pressure sensor device as recited in claim 1, wherein the electrode is directly or indirectly spring-mounted in two-dimensional fashion in the pressure chamber by the at least one spring element of the plurality of micromechanical spring elements, a further layer that increases a stiffness of the electrode being provided between the sensing membrane and the electrode.

3. The pressure sensor device as recited in claim 2, wherein the further layer is a sacrificial layer.

4. The pressure sensor device as recited in claim 2, wherein the electrode and at least one spring element of the plurality of micromechanical spring elements are constituted by a single layer of the pressure sensor device, the layer being an auxiliary layer.

5. The pressure sensor device as recited in claim 2, wherein:
   at least one spring element of the plurality of micromechanical spring elements has a first element region with which it is mechanically directly or indirectly coupled to the counterelectrode; and/or
   at least one spring element of the plurality of micromechanical spring elements has at least one second element region with which it is mechanically directly or indirectly coupled to the sensing membrane or to the electrode; and/or
   at least one spring element of the plurality of micromechanical spring elements has at least one actual spring between the first element region and the second element region, or only at the first or second element region; and/or
   the at least one actual spring of the at least one spring element of the plurality of micromechanical spring elements is mechanically directly or indirectly coupled to the sensing membrane or the electrode; and/or
   the at least one actual spring of the at least one spring element of the plurality of micromechanical spring elements is mechanically directly or indirectly coupled to the counterelectrode.

6. The pressure sensor device as recited in claim 5, wherein:
   the at least one spring element of the plurality of micromechanical spring elements is a mechanical spring and/or an elastic spring; or
   the at least one actual spring is a mechanical spring and/or an elastic spring; or
   the at least one spring element of the plurality of micromechanical spring elements or the at least one actual spring has an integral hinge or a film hinge on at least one longitudinal end segment.

7. The pressure sensor device as recited in claim 2, wherein the at least one spring element is an angled spring element, the at least one second element region and/or the electrode being situated at an angle of approximately 135° relative to the first element region.

8. The pressure sensor device as recited in claim 2, wherein the at least one spring element is an angled spring element, the at least one second element region and/or the electrode being situated at an angle of approximately 90° relative to the first element region.

9. The pressure sensor device as recited in claim 2, wherein:
   the sensing membrane is a comparatively soft or comparatively very soft sensing membrane; and/or
   the sensing membrane is a comparatively thin sensing membrane; and/or
   the sensing membrane and/or the electrode is a spring core sensing membrane and/or a spring core electrode; and/or
   the pressure sensor device is a reference pressure sensor device or a functional pressure sensor device.

10. The pressure sensor device as recited in claim 1, wherein the at least one spring element of the plurality of micromechanical spring elements has at least one actual spring, and the at least one spring element or the at least one actual spring is:
    a spring that extends substantially in two or three dimensions; and/or
    a tension spring, and/or a bending spring, and/or a torsion spring; and/or
    a meander spring and/or a spring that can be unfolded in step-shaped fashion, and/or
    a profile spring.

11. The pressure sensor device as recited in claim 1, wherein the at least one micromechanical spring element is configured to act as a mechanical stop for the movable sensing membrane.

12. A method for producing a capacitive pressure sensor device, comprising:
    setting up at least one micromechanical spring element directly or indirectly over a stationary counterelectrode of a substrate of a resulting pressure sensor device;
    setting up a movable sensing membrane of the pressure sensor device in temporal sequence, directly or indirectly over the at least one micromechanical spring element,
    wherein the at least one micromechanical spring element includes a plurality of micromechanical spring elements,
    wherein the movable sensing membrane has a plurality of electrodes movable by the movable sensing membrane, wherein each electrode of the plurality of electrodes are situated between respective adjacent micromechanical spring elements of the plurality of micromechanical spring elements.

13. The method as recited in claim 12, wherein, during the setting up of the at least one spring element, a movable electrode of the pressure sensor device is also set up, the movable electrode and the at least one spring element being fashioned monolithically or integrally with one another.

14. The method as recited in claim 13, wherein for the setting up of the at least one spring element and the electrode, first an auxiliary layer is deposited, and in temporal sequence, the auxiliary layer is structured in such a way that the at least one spring element and the electrode are exposed therefrom.

15. The method as recited in claim 12, wherein:
    the at least one spring element is supported directly or indirectly on the substrate via an island exposed in a layer of the counterelectrode; and/or
    an open space is set up between the at least one spring element and the sensing membrane.

16. A capacitive pressure sensor, comprising:
    a pressure sensor device, including:
       a movable sensing membrane,
       a stationary counterelectrode, and
       a pressure chamber bounded by the sensing membrane and the counterelectrode of the pressure sensor device, the sensing membrane and the counterelectrode each running in a longitudinal direction of the pressure sensor device and a transverse direction of the pressure sensor device,
       wherein the sensing membrane is directly or indirectly spring-mounted in two-dimensional fashion in the pressure chamber relative to the counterelectrode by at least one micromechanical spring element, wherein the at least one micromechanical spring element includes a plurality of micromechanical spring elements, wherein the movable sensing membrane has a plurality of electrodes movable by the movable sensing membrane, wherein each electrode of the plurality of electrodes are situated between respective adjacent micromechanical spring elements of the plurality of micromechanical spring elements.

17. An entity, comprising:
a capacitive pressure sensor, having:
    a pressure sensor device, the pressure sensor device including:
        a movable sensing membrane,
        a stationary counterelectrode, and
        a pressure chamber bounded by the sensing membrane and the counterelectrode of the pressure sensor device, the sensing membrane and the counterelectrode each running in a longitudinal direction of the pressure sensor device and a transverse direction of the pressure sensor device,
    wherein the sensing membrane is directly or indirectly spring-mounted in two-dimensional fashion in the pressure chamber relative to the counterelectrode by at least one micromechanical spring element,
wherein the at least one micromechanical spring element includes a plurality of micromechanical spring elements,
wherein the movable sensing membrane has a plurality of electrodes movable by the movable sensing membrane, wherein each electrode of the plurality of electrodes are situated between respective adjacent micromechanical spring elements of the plurality of micromechanical spring elements.

\* \* \* \* \*